Dec. 5, 1961   R. C. RADER   3,011,847
TRUNK MOUNTED AUTOMOBILE TABLE
Filed June 15, 1959
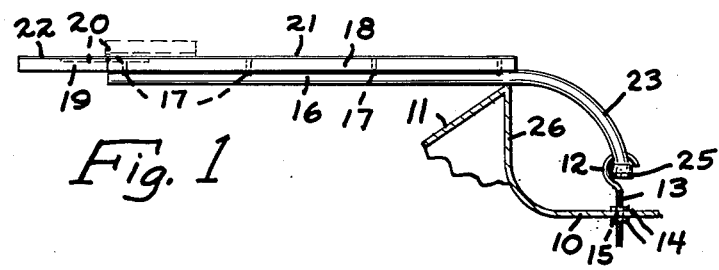
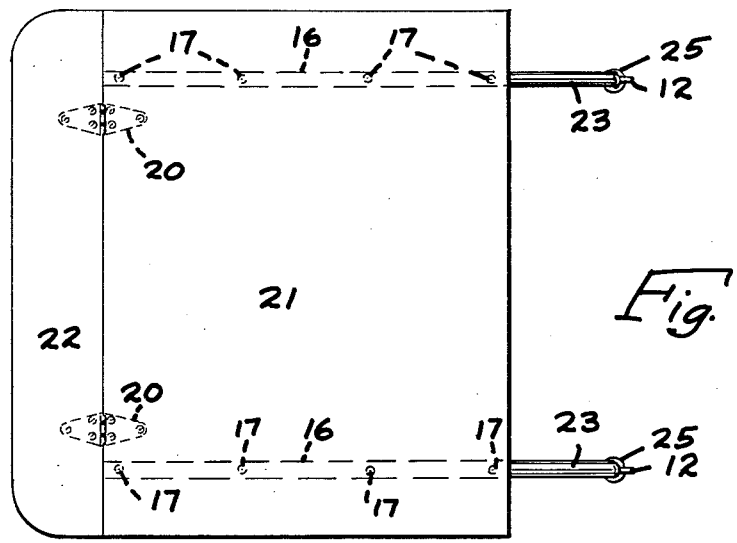
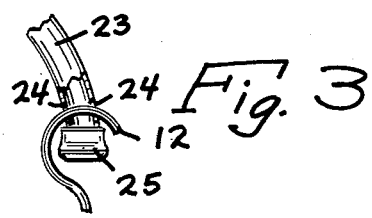
INVENTOR.
Rollo C. Rader
BY
Sam J. Slotsky
ATTORNEY ns filed June 15, 1959, Ser. No. 820,331

United States Patent Office 3,011,847
Patented Dec. 5, 1961

3,011,847
TRUNK MOUNTED AUTOMOBILE TABLE
Rollo C. Rader, 2904 Dodge Ave., Sioux City, Iowa
Filed June 15, 1959, Ser. No. 820,331
2 Claims. (Cl. 311—21)

My invention relates to an automobile table.

An object of my invention is to provide an automobile table which can be conveniently stored in the automobile trunk, and which can also be readily mounted to the trunk bottom wall so that the table can overhang the rear end of tthe vehicle or trunk, and can be used for eating or any other desired purpose.

A further object of my invention is to provide a simplified arrangement.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

FIGURE 1 is a side elevation of my table as mounted to an automobile trunk,

FIGURE 2 is a plan view of FIGURE 1, and

FIGURE 3 is an enlarged sectional detail.

My invention contemplates the provision of a flat table which can be used on automobile trips for eating or other purposes, and which table is easily carried by the trunk and can be stored therein, and can then be opened for use and conveniently suspended from portions of the trunk.

I have used the character 10 to designate the bottom wall of an automobile rear trunk, the character 11 indicating a further wall portion extending from the bottom wall 10, and I have further used the character 12 to indicate a pair of hooks having the threaded portions 13, to which threaded portions are secured the nuts 14 which pass through openings 15 in the trunk wall 10 to thereby firmly secure the hooks 12.

I have further used the character 16 to indicate a pair of tubular members which are attached by means of the screws 17 to the flat plywood table member 18, and I have further used the character 19 to indicate a further plywood member which is suitably hinged by means of the hinges 20 to the member 18, and covering the plywood members 18 and 19 are the thin Formica or other plastic sheets 21 and 22. The major portions of the hinges 20 are covered by the sheets 21 and 22 and are thus practically completely hidden.

The tubular members 16 extend into the end arcuate portions 23 which include the slots 24 (see FIGURE 3) for the reception of the hooks 12, the portions 23 terminating in the rubber tips 25. When the arrangement is stored in the trunk it is disengaged from the hooks 12 and the portions 19, 22 are folded over as shown in FIGURE 1 where it will be of reduced size and will then more readily fit into the trunk space.

For use, however, the members 19, 22 are folded outwardly as shown in FIGURE 1, and the slots 24 are engaged with the hooks 12, whereby the arrangement will thus be solidly secured for table purposes or even to carry extra luggage, if such is desired, with the trunk closed.

It will be noted that the threaded portion 13 of the hooks 12 permits an adjustment whereby the arrangement can be made to be perfectly horizontal regardless of the depth of the trunk portion 26 by merely adjusting nuts 14.

It will now be noted that I have provided the advantages mentioned in the objects of my invention with further advantages being apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A trunk mounted automobile table for automobile trunks having an upwardly extending rear wall portion and a bottom wall comprising a flat table member, a pair of braces secured to said flat table member, said braces having arcuate downwardly projecting end portions adapted to be attached to said automobile trunk bottom wall, hooks attached to said automobile trunk bottom wall, said arcuate portions having slots engaging said hooks, said hooks having lower threaded portions, nuts engaging said threaded portions, said trunk bottom wall having openings for receiving said lower hook portions and whereby said nuts can be used for adjustably positioning said hooks to provide horizontal positioning of said table member when said table member rests upon the upper edge of said upwardly extending rear wall.

2. A trunk mounted automobile table for automobile trunks having an upwardly extending rear wall portion and a bottom wall comprising a flat table member, a pair of braces scured to said flat table member, said braces having arcuate downwardly projecting end portions adapted to be attached to said automobile trunk bottom wall, hooks attached to said automobile trunk bottom wall, said arcuate portions having slots engaging said hooks, said hooks having lower threaded portions, nuts engaging said threaded portions, said trunk bottom wall having openings for receiving said lower hook portions and whereby said nuts can be used for adjustably positioning said hooks to provide horizontal positioning of said table member when said table member rests upon the upper edge of said upwardly extending rear wall, an auxiliary table member portion hinged to said table member for allowing inward folding of said auxiliary portion.

References Cited in the file of this patent

UNITED STATES PATENTS

| 655,003 | Page | July 31, 1900 |
| 1,259,960 | Coll | Mar. 19, 1918 |
| 2,254,437 | Marney | Sept. 2, 1941 |
| 2,471,730 | Doeer | May 31, 1949 |

FOREIGN PATENTS

| 158,448 | Great Britain | Feb. 10, 1921 |